United States Patent
Hsieh

(12) 
(10) Patent No.: US 6,474,610 B1
(45) Date of Patent: Nov. 5, 2002

(54) VEHICLE TISSUE BOX PLACEMENT ASSEMBLY

(76) Inventor: Chih-Ming Hsieh, 7F, No. 19, Alley 1, Lane 269, Wu Shing St., Taipei (TW)

( * ) Notice: Subject to any disclaimer, the term of this patent is extended or adjusted under 35 U.S.C. 154(b) by 0 days.

(21) Appl. No.: 09/842,426

(22) Filed: Apr. 27, 2001

(51) Int. Cl.[7] .................................................. A47F 5/00
(52) U.S. Cl. ..................................... 248/309.1; 248/905
(58) Field of Search ............................. 248/309.1, 905; 224/275, 277

(56) References Cited

U.S. PATENT DOCUMENTS

| | | | | |
|---|---|---|---|---|
| 3,168,275 A | * | 2/1965 | Grondin | 248/905 X |
| 4,696,449 A | * | 9/1987 | Woo et al. | 248/309.1 X |
| 5,029,787 A | * | 7/1991 | Florentin | 248/905 X |
| 5,065,970 A | * | 11/1991 | Gross | 248/905 X |
| 5,695,160 A | * | 12/1997 | Cockrum | 248/905 X |
| 6,170,725 B1 | * | 1/2001 | Ganues | 224/277 X |

FOREIGN PATENT DOCUMENTS

| | | | |
|---|---|---|---|
| JP | 2000-210225 | * | 12/2000 |

* cited by examiner

*Primary Examiner*—Ramon O. Ramirez
(74) *Attorney, Agent, or Firm*—Troxell Law Office PLLC

(57) ABSTRACT

A vehicle tissue box placement assembly comprises attached fastening belt body, a frame bracket to be engaged to the object such as the sun visor inside the vehicle by means of the fastening belt body, and a case body for accommodating the tissue box; wherein the case body and the frame bracket can be engaged and cased to each other and also provide the case body with a easy dismounting method which makes the placement assembly not only provide a fixed location for using the tissue box inside the vehicle, but also further simplify the movement of replacing the tissue box.

4 Claims, 2 Drawing Sheets

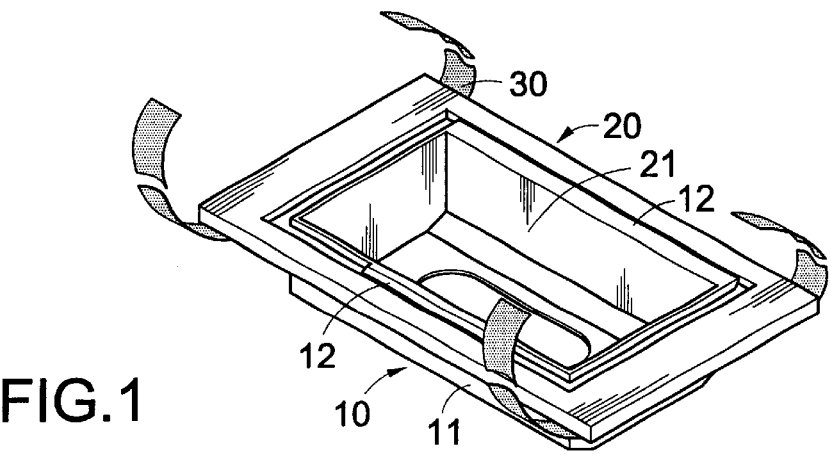
FIG.1
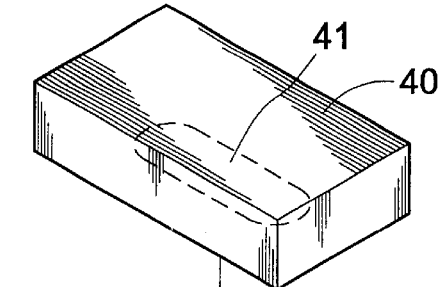
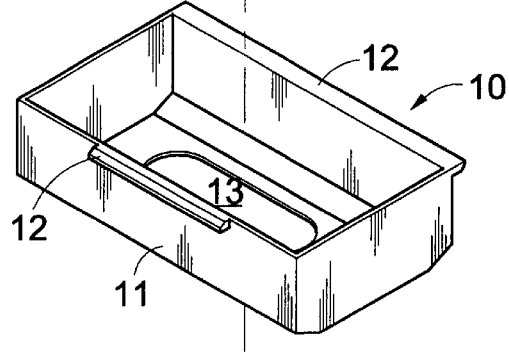
FIG.2
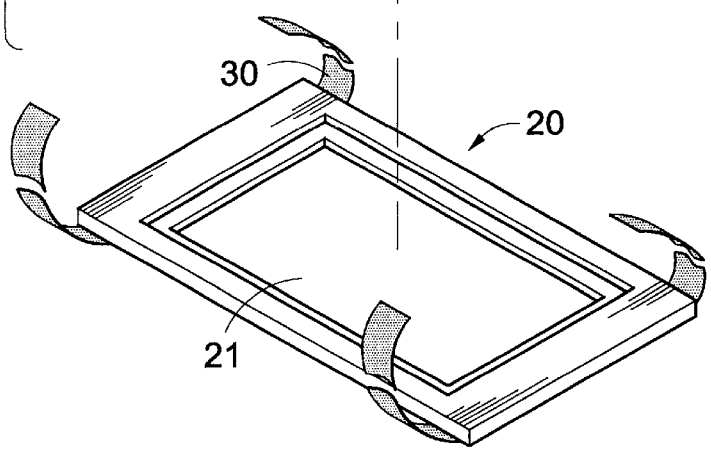

VEHICLE TISSUE BOX PLACEMENT ASSEMBLY

BACKGROUND OF THE INVENTION

1) Field of the Invention

The present invention relates to a vehicle tissue box placement assembly that is a design providing the tissue (box) with a specific location for fixing and using inside the vehicle not only enabling the usage of the tissue (box) to become more convenient, but also solving problems derived from putting the tissue box wherever at will.

2) Description of the Prior Art

The tissue or toilet paper has become one of the common cleansers in ordinary life. Since people needs to use the tissue or toilet paper anywhere, they are provided no matter at home, in school, or even in the transportation.

Just the same, the owner of the automobile usually prepares the boxed or the bagged tissues. However, there is no any location disposed for fastening and placing the tissue (box), the tissue box is often placed on the platform at the rear end of the seat, but the location is usually too far from the front seat to be convenient for accessing. Therefore, for the convenient purpose, many car owners just put the tissue box at any closer place at will, for examples, on the front passenger's seat or the space between the two front seats. Although this manner conveniences access to the tissues, however, the automobile is one kind of transportations and the tissue box may slide transportations and the tissue box may slide frequently or even drop under the seat. Furthermore, since the tissue box is generally made of paper material, it tends to deform under pressure and that is very troublesome.

SUMMARY OF THE INVENTION

In view of this, the primary objective of the present invention is to solve the mentioned problems by providing the tissue (box) with a design for fastening it to a specific location for use inside the vehicle, for making the usage of the tissue (box) become more convenient and also for solving various problems derived from putting the tissue box wherever at will. Based on this, the present invention provides a tissue (box) placement assembly exclusive for the automobile, which comprises a frame bracket to be engaged to the object such as the sun visor inside the vehicle and a case body for accommodating the tissue (box); wherein the case body and the frame bracket can be engaged and cased to each other and provide the case box with a easy dismounting method; the placement assembly not only provides a fixed location for using the tissue (box) inside the vehicle, but also speed up the movement of replacing the tissue (box).

The related detail description and technical contents of the present invention will be illustrated by the following description of the drawings.

BRIEF DESCRIPTION OF THE DRAWINGS

FIG. 1 is a schematic drawing of the external view of the present invention.

FIG. 2 is a pictorial drawing of the disassembled present invention.

DETAILED DESCRIPTION OF THE PREFERRED EMBODIMENTS

Figure 3:
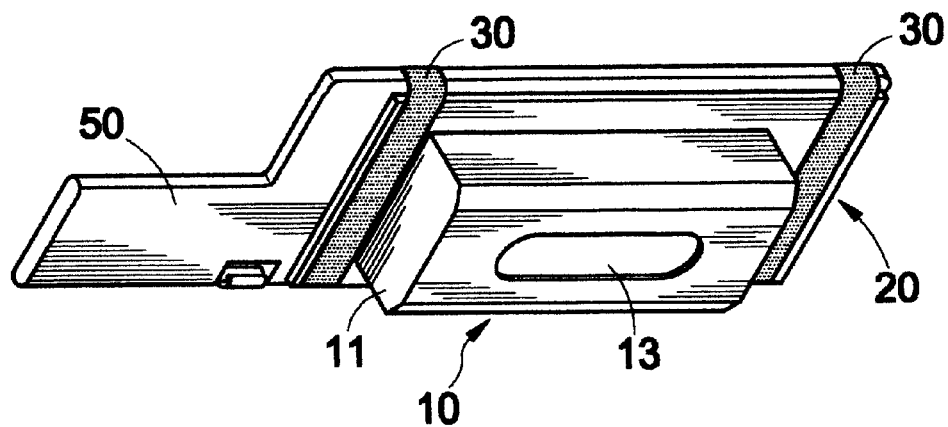
FIG. 3 is an exemplary embodiment drawing of the present invention.

The present invention is a vehicle tissue (box) placement assembly for fastening the tissue (box) at a specific location inside the vehicle, referring to FIG. 1, the said tissue box placement assembly consists of a case body (10), a frame bracket (20) and at least one fastening belt body (30); the case body (10) comprises a case (11) for accommodating the tissues or the tissue box; the external lateral rim of the case (11) is mounted with the extending outward engagement block (12), and a slot opening (13) is opened correspondingly to the extraction opening (41) of the tissue box (40); basically, the frame bracket (20) is a piece-shaped body with a hollow slot (21) disposed thereon; the hollow slot (21) is dimensioned just for the case (11) to go through; in other words, the case (11) of the case body (10) can go through the hollow slot (21) from one side, but when it reaches the engagement block (12), since the space of the hollow slot (21) is not enough to allow the engagement block (12) to smoothly go through but will press it against the frame bracket (20) body outside the hollow slot (21); as to the fastening belt body (30), it is a clinging snap belt or a elastic belt connected onto the frame bracket (20), thereby, by means of the fastening belt body (30), the frame bracket (20) can be cased and engaged onto the specific object inside the vehicle.

Figure 4:
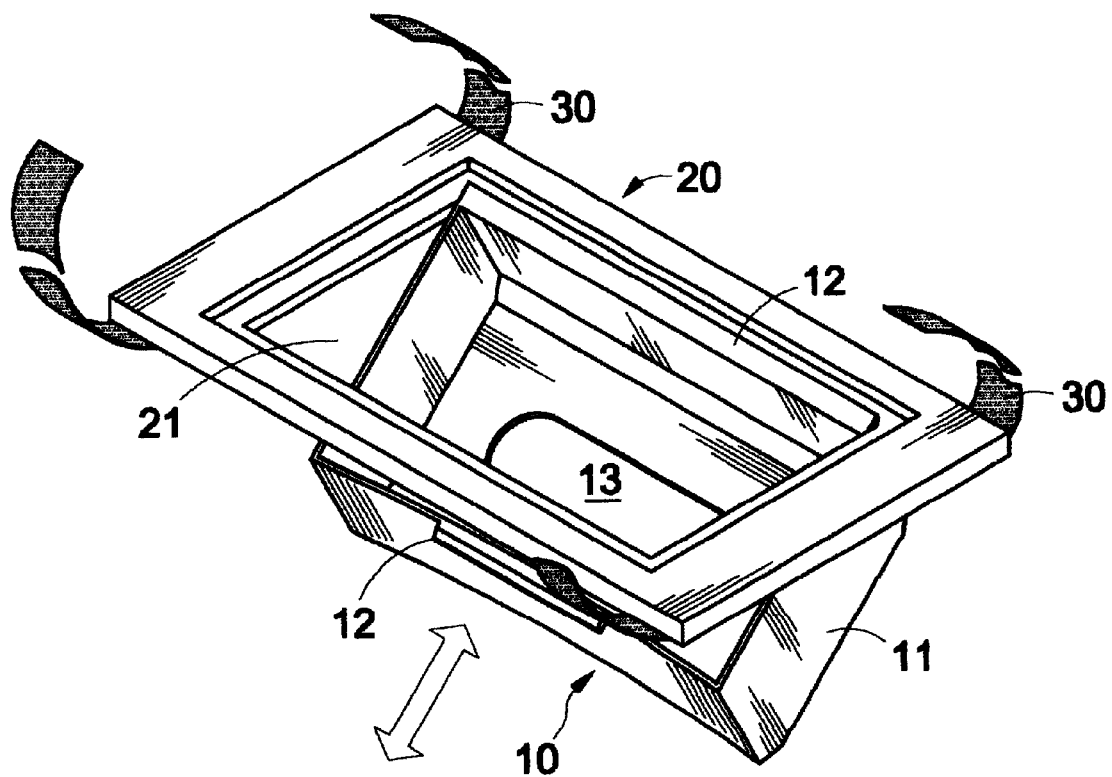
FIG. 4 is a movement drawing of replacing the tissues of the present invention.

Through the mentioned assembly, as shown in FIG. 3, the present invention is fastened onto the sun visor (50) inside the vehicle by means of the fastening belt body (30) and enables the case body (10) containing the tissue box (40) cased and engaged with the frame bracket (20) to be situated at the lower side of the sun visor (50), so that the tissue box (40) can be fastened to a fixed specific location inside the vehicle for use, therefore, various problems derived from putting the tissue box (40) anywhere at will could be solved; furthermore, as to the need to replace the tissues box (40) used up, in addition to moving both the frame bracket (20) and the case body (10) down together after dismounting the fastening belt body (30) from the sun visor (50), the present invention also provides a more convenient way of replacing the tissue box (40); as shown in FIG. 4, mainly the case (11) of the case body (10) is made of resilient materials, so the case body (10) could bend and deform inwardly by the external force to make the engagement block (12) go through the hollow slot (21) and directly dismount downwardly from the frame bracket (20); as the same, when the new tissue box (40) is replaced inside the case body (10), by only depressing the case body (10) to cause the material adaptation of the case body (10), and first positioning one side of the engagement block (12) onto the frame bracket (20), then pushing the case body (10) reversely through the frame bracket (20), when the exerting of pressure is stopped, the case body (10) will resume to its original shape and the case body (10) could then be blocked by the engagement block (12) to press against the frame bracket (20) and limited from separation.

In summation of the foregoing sections, in addition to providing the tissue box with a fixed location for fastening, the present invention also provides the case body and the frame bracket with a structure for easy dismounting to facilitate the replacement of the tissue box.

What is claimed is:

1. A vehicle tissue box placement assembly for fastening the tissue box to a specification location inside a vehicle comprising:

a case body including a case for accommodating the tissue box, an extending outwardly engagement block is disposed on an external lateral rim of the case with a slot opening corresponding to an opening of the tissue box;

a frame bracket with a hollow slot dimensioned for the case to go through but limiting the engagement block to press against the frame bracket outside the hollow slot; and, at least one fastening belt body connected to the frame bracket and fastening onto an object inside the vehicle.

2. The vehicle tissue box placement assembly of claim 1, wherein the fastening belt body is a clinging snap belt.

3. The vehicle tissue box placement assembly of claim 1, wherein the fastening belt body is an elastic belt.

4. The vehicle tissue box placement assembly of claim 1, wherein the case is made of a resilient material.

* * * * *